US010775855B2

(12) United States Patent
Pacquing

(10) Patent No.: US 10,775,855 B2
(45) Date of Patent: Sep. 15, 2020

(54) CIRCUIT CARD ASSEMBLY RELEASE TOOL

(71) Applicant: LOCKHEED MARTIN CORPORATION, Bethesda, MD (US)

(72) Inventor: Steve J. V. Pacquing, West Hills, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 684 days.

(21) Appl. No.: 14/823,447

(22) Filed: Aug. 11, 2015

(65) Prior Publication Data

US 2017/0049015 A1    Feb. 16, 2017

(51) Int. Cl.
*G06F 1/18* (2006.01)

(52) U.S. Cl.
CPC .............. *G06F 1/18* (2013.01); *G06F 1/186* (2013.01); *Y10T 29/53274* (2015.01)

(58) Field of Classification Search
CPC .............. Y10T 29/53274; Y10T 29/53; Y10T 29/53283; H05K 13/0491; H05K 13/0486; H05K 7/1402; G06F 1/18; G06F 1/186
USPC .................... 29/764, 739, 762, 278; 439/327
See application file for complete search history.

(56) References Cited

U.S. PATENT DOCUMENTS

| 3,617,083 | A | | 11/1971 | Koppensteiner et al. |
| 3,759,559 | A | * | 9/1973 | Yuska ..................... B65G 7/12 |
| | | | | 294/15 |
| 4,109,379 | A | | 8/1978 | Ratti et al. |
| 4,780,792 | A | * | 10/1988 | Harris ................... H05K 7/1409 |
| | | | | 211/41.17 |
| 4,787,856 | A | * | 11/1988 | Chazin ............... H01R 12/7005 |
| | | | | 439/152 |
| 4,858,309 | A | | 8/1989 | Korsunsky et al. |
| 5,046,237 | A | * | 9/1991 | Conforti ............... H01R 43/205 |
| | | | | 29/278 |
| 5,230,143 | A | * | 7/1993 | Karlovich .............. H01R 43/26 |
| | | | | 29/758 |
| 5,265,328 | A | | 11/1993 | Gorman |
| 6,018,867 | A | * | 2/2000 | Boe ......................... H01R 43/26 |
| | | | | 29/258 |
| 7,396,244 | B1 | | 7/2008 | Barna et al. |
| 7,913,379 | B2 | | 3/2011 | Bodenweber et al. |
| 7,987,584 | B2 | | 8/2011 | Barna et al. |

* cited by examiner

*Primary Examiner* — Peter Dungba Vo
*Assistant Examiner* — Azm A Parvez
(74) *Attorney, Agent, or Firm* — Baker Botts L.L.P.

(57) ABSTRACT

A circuit card assembly release tool is disclosed. The tool includes a body and two flanges extending outward from the body at an end of the body. The tool is structured and arranged such that the two flanges are adapted to simultaneously apply a force to two ejectors that are pivotally connected to a seated circuit card assembly when the tool is urged in a direction relative to the seated circuit card assembly.

17 Claims, 5 Drawing Sheets

CIRCUIT CARD ASSEMBLY RELEASE TOOL

FIELD OF THE INVENTION

The invention is directed to a tool used to manipulate computer system components. More particularly, the invention is directed to a release tool used to extract a circuit card assembly from engagement with a computer.

BACKGROUND DESCRIPTION

A circuit card assembly (CCA) is a type of printed circuit board (PCB) assembly that mechanically supports and electrically connects electronic components using conductive tracks, pads and other features on a non-conductive substrate. A CCA has an electrical connector at one side edge of the card that is configured to mate with a corresponding electrical connector of a computer at a contact interface. The contact interface typically includes a socket on a motherboard of the computer. The socket is typically an elongate slot that receives the edge of the CCA in frictional engagement, such that electrical contacts at the edge of the CCA are in direct physical contact with electrical contacts in the socket. CCAs are frequently connected to a computer in a holder or rack having the shape of an open-topped (or open-sided) box whose sidewalls form tracks for the guidance of the CCAs into and out of their connected position.

CCAs are used extensively in naval and aerospace applications, particularly in military applications. For example, a shipboard launch sequencer may include dozens of CCAs, each of which is individually connected to a computer at a respective contact interface. The most common way to disconnect CCAs from the computer is through manual manipulation by a human operator. For example, some CCAs include pivoted ejectors at one end of the card opposite the edge of the card that is received in the socket. To remove the CCA from the computer requires the operator to use their fingers and/or thumbs to apply pressure to the pivoted ejectors. A problem arises in that it is difficult to quickly and efficiently remove large numbers (e.g., dozens) of CCA's without damaging the CCA's and without injuring the hands of the human operator.

SUMMARY OF THE INVENTION

In an aspect of the invention there is a circuit card assembly release tool. The tool includes a body and two flanges extending outward from the body at an end of the body. The tool is structured and arranged such that the two flanges are adapted to simultaneously apply a force to two ejectors that are pivotally connected to a seated circuit card assembly when the tool is urged in a direction relative to the seated circuit card assembly.

In another aspect of the invention, there is a circuit card assembly release tool that includes a body two flanges extending outward from the body at an end of the body. The two flanges define a first dimension that is greater than a first distance defined between two ejectors that are pivotally connected to a circuit card assembly when the two ejectors are rotated to a first position relative to the circuit card assembly. The first dimension is less than a second distance defined between the two ejectors when the two ejectors are rotated to a second position relative to the circuit card assembly.

In still yet another aspect of the invention, there is a method of manufacturing a circuit card assembly release tool. The method includes forming a body and forming two flanges extending outward from the body at an end of the body. The two flanges define a first dimension that is greater than a first distance defined between two ejectors that are pivotally connected to a circuit card assembly when the two ejectors are rotated to a first position relative to the circuit card assembly. The first dimension is less than a second distance defined between the two ejectors when the two ejectors are rotated to a second position relative to the circuit card assembly.

BRIEF DESCRIPTION OF THE DRAWINGS

The invention is described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF EMBODIMENTS OF THE INVENTION

The invention is directed to a tool used to manipulate computer system components. More particularly, the invention is directed to a release tool used to extract a circuit card assembly from engagement with a computer. According to aspects of the invention, the tool includes a device that is sized and shaped to fit between ejectors that are pivotally connected to a seated CCA (i.e., a CCA that is connected to a computer), and to convey a force to each of the ejectors simultaneously for unseating the CCA (i.e., disconnecting the CCA from the computer). In this manner, the inventive tool may be used by an operator to unseat a CCA from a computer without the operator using their fingers and/or thumbs to directly manipulate the ejectors.

Using the inventive tool described herein allows an operator to unseat plural CCAs faster and easier than the conventional manual process. For example, a job of unseating dozens of CCAs that takes about twenty to twenty-five minutes using the conventional manual process can now be performed in about two to three minutes using the inventive tool described herein. Moreover, using the inventive tool described herein is more comfortable for an operator since it is not necessary for the operator to apply finger/thumb pressure directly to the ejectors.

Figure 1:
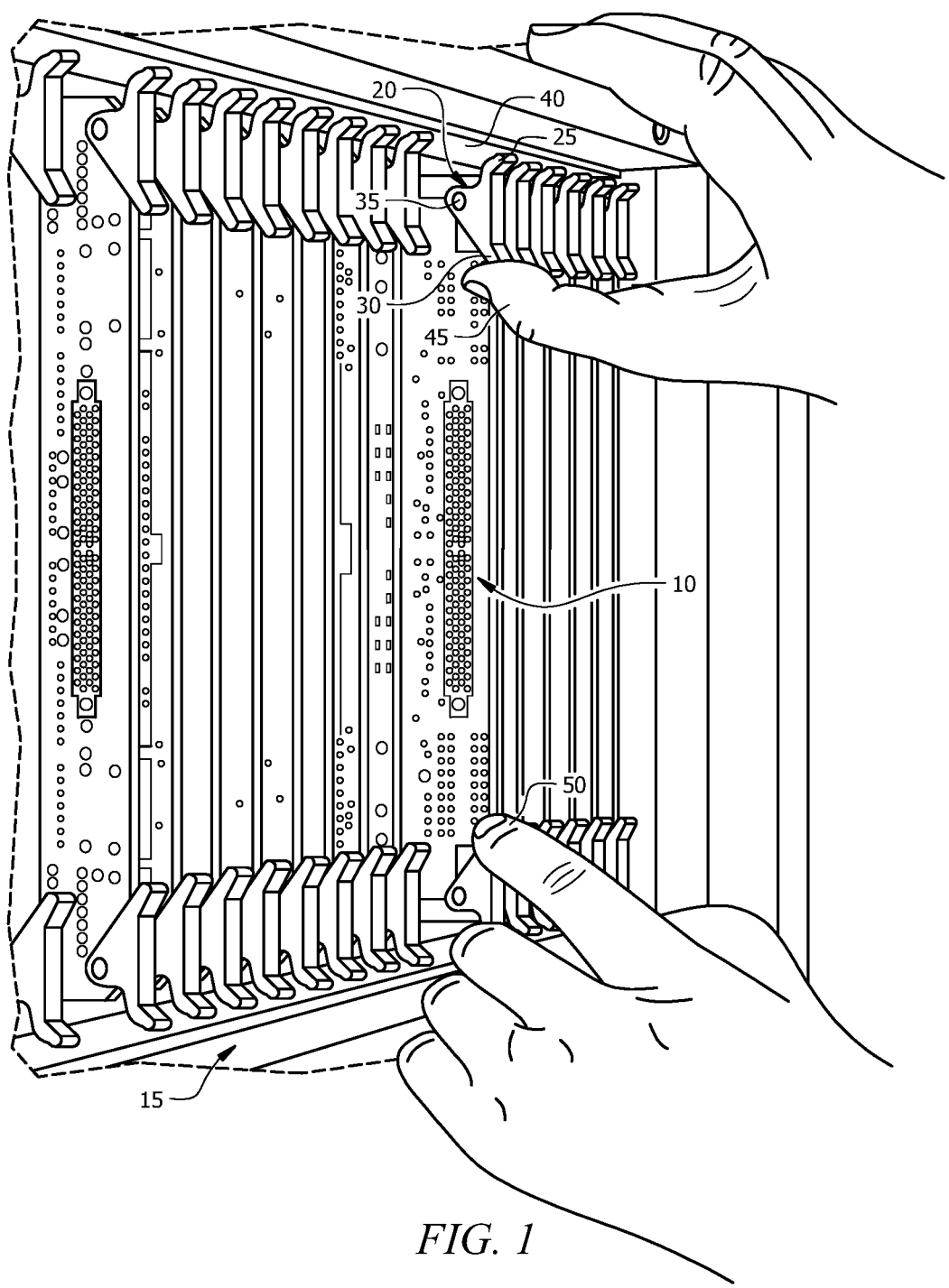
FIG. 1 shows plural CCAs connected to a computer in a card guided computer enclosure.

FIG. 1 shows plural CCAs connected to a computer in a card guided computer enclosure. As shown in FIG. 1, CCA 10 is held in a rack 15 that guides top and bottom edges of the CCA for inserting the CCA into a socket of a computer motherboard (not shown). CCA 10 includes ejectors 20 at an edge of the card opposite the edge that is inserted into the socket. CCA 10 is shown in a seated position in FIG. 1, i.e., in a position where the edge of the CCA is frictionally held in the socket such that electrical contacts at the edge of the CCA are in direct physical contact with electrical contacts in the socket.

Still referring to FIG. 1, the ejector 20 has a first (outboard) leg 25 and a second (inboard) leg 30, and is pivotally connected to the CCA 10 with a pin 35. In the seated position, the outboard leg 25 rests against a rail 40 of the rack 15, and the inboard leg 30 extends in a direction toward a centerline of the CCA 10. The ejectors 20 do not lock the CCA in place in that they do not engage a tooth, catch, or detent. Instead, the CCA 10 is held in the rack 15 by friction fit between the edge of the CCA and the socket.

Figure 2:
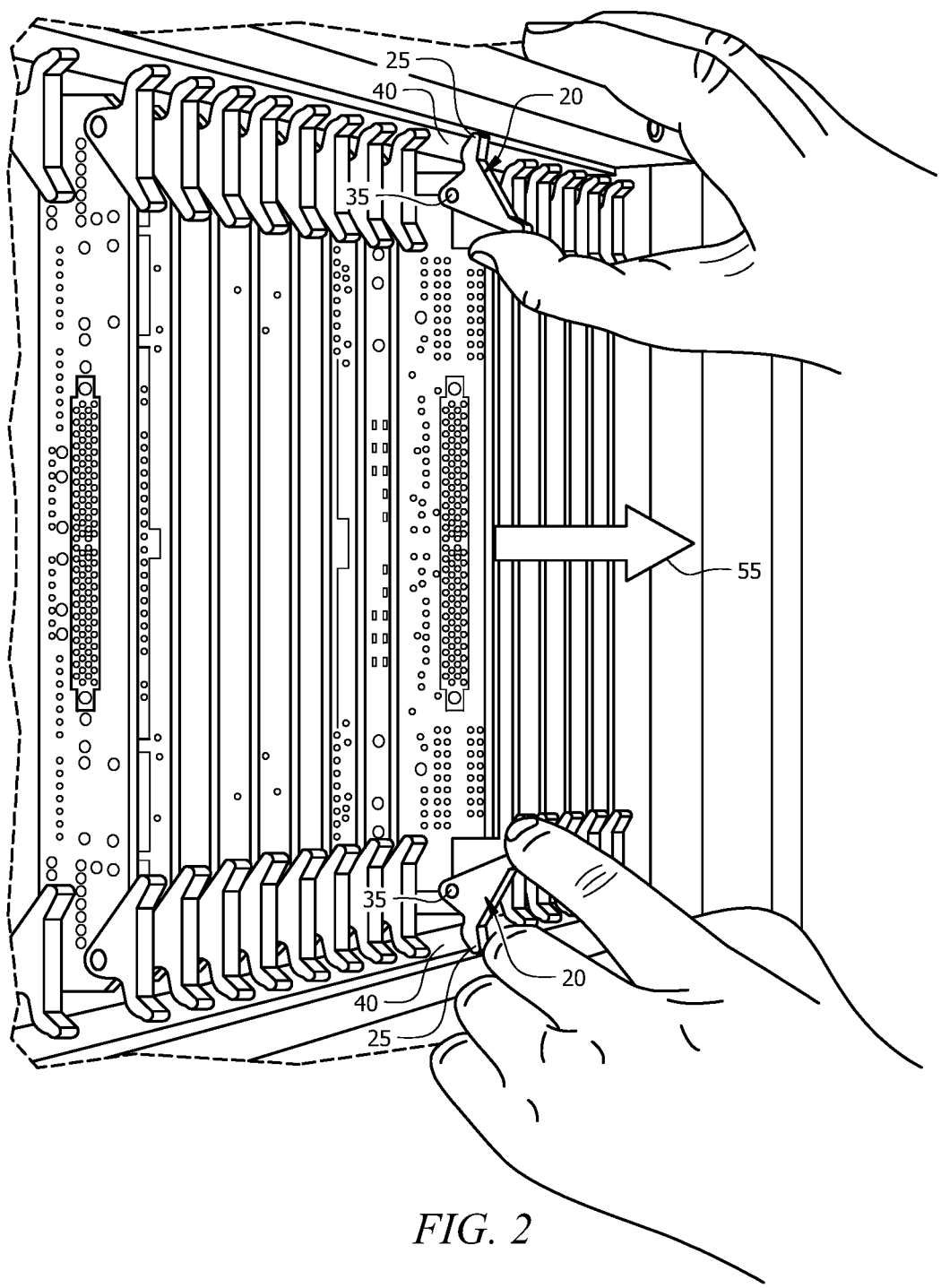
FIG. 2 shows one of the CCAs being manually disconnected (e.g., unseated) from the computer.

To unseat (e.g., disconnect) the CCA 10 from the socket, an operator uses their thumb 45 and/or finger 50 to apply pressure directly to the inboard leg 30 of each ejector 20 to create a moment arm about the axis of rotation defined by the pin 35. The force applied to the moment arm creates a rotational force that rotates the ejector 20 relative to the CCA 10. The outboard leg 25 remains abutted against the rail 40 during the rotation of the ejector 20. In this manner, the rotation of the ejector 20 causes a linear translation of the CCA 10 in a direction of arrow 55 shown in FIG. 2, thereby unseating the CCA 10 from the socket. This conventional manual process for unseating the CCA 10 can be painful for the operator since the operator applies direct pressure to the ejectors 20 with their thumbs and/or fingers.

Figure 3:
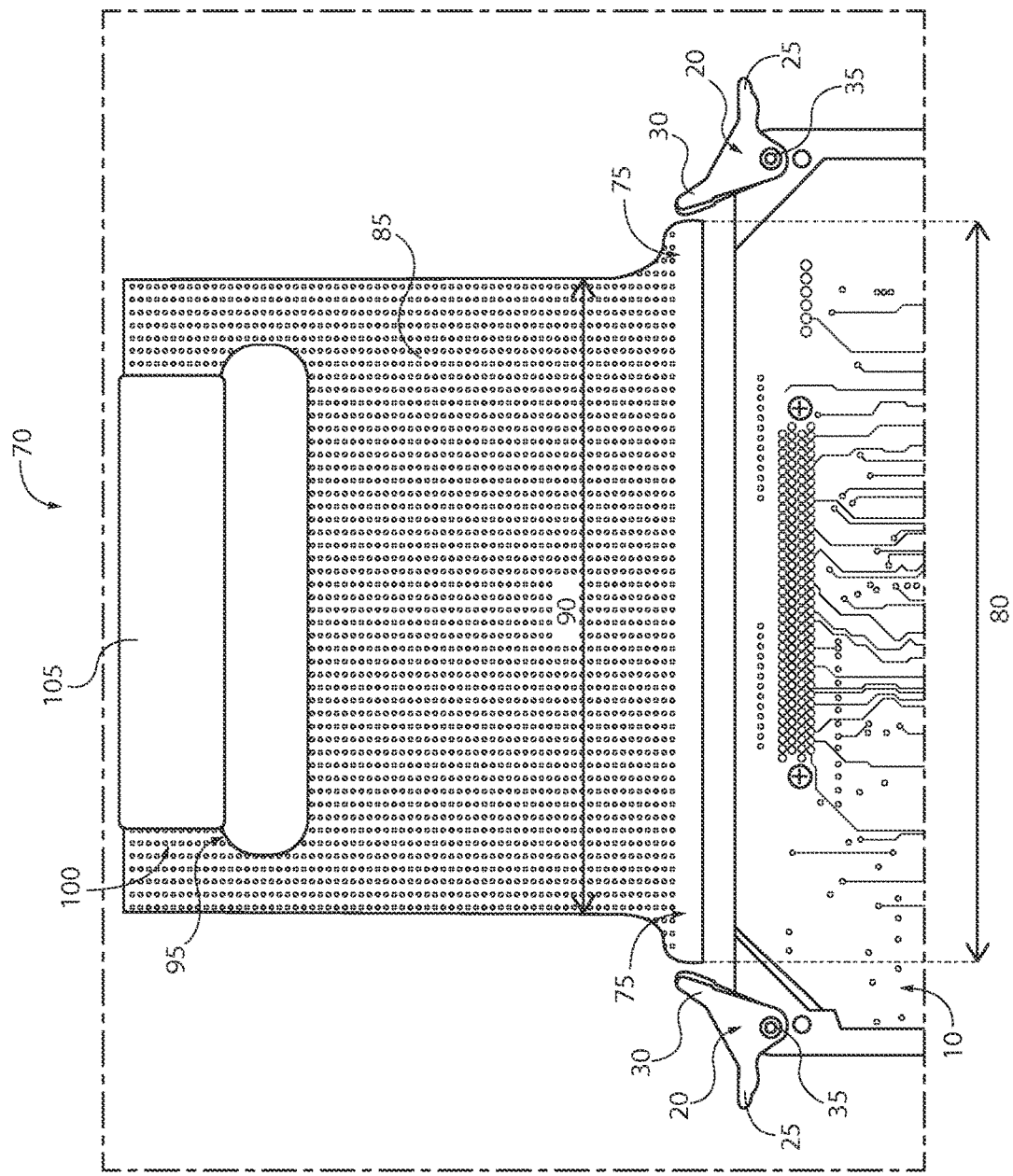
FIG. 3 shows an extraction tool in accordance with aspects of the invention.

FIG. 3 shows an extraction tool 70 in accordance with aspects of the invention. In embodiments, the tool 70 is structured and arranged to be used with a CCA similar to that described in FIGS. 1 and 2, e.g., a CCA 10 in which two ejectors 20 are pivotally connected to the card by a pin 35, and where each ejector 20 has an inboard leg 30 and an outboard leg 25. The tool 70 includes flanges 75 that define a first dimension 80. In aspects described herein, the first dimension 80 is greater than a first distance defined between the two ejectors 20 of the CCA 10 when the two ejectors 20 are rotated to a first position relative to the CCA 10. In aspects described herein, the first dimension 80 is also less than a second distance defined between the two ejectors 20 of the CCA 10 when the two ejectors 20 are rotated to a second position relative to the CCA 10. In embodiments, the first position of the ejectors 20 relative to the CCA 10 corresponds to when the CCA 10 is seated in the socket (e.g., connected to the computer), and the second position of the ejectors 20 relative to the CCA 10 corresponds to when the CCA 10 is unseated from the socket (e.g., disconnected from the computer).

Still referring to FIG. 3, the flanges 75 extend from a body 85 of the tool 70. The body 85 has a second dimension 90 in the same (parallel) direction as the first dimension 80 and of smaller magnitude than the first dimension 80. In embodiments, the second dimension 90 is less than the first distance defined between the two ejectors 20 of the CCA 10 when the two ejectors 20 are rotated to a first position relative to the CCA 10.

The tool 70 may be composed of any suitable material. In embodiments, the tool 70 is composed of an electrically insulative (non-conductive material) to avoid imparting electrostatic discharge (ESD) to the circuits on the CCA 10. In an exemplary implementation, the tool 70 is composed of non-copper clad printed circuit board material that is cut and/or milled to the size and shape described herein, although other materials may be used.

With continued reference to FIG. 3, the tool 70 may include a hole 95 in the body 85. In this manner, a hand grip 100 is defined at an end of the tool 70 opposite the flanges 75. Moreover, a soft material 105 may be wrapped around the hand grip 100 for comfort of the operator.

Figure 4:
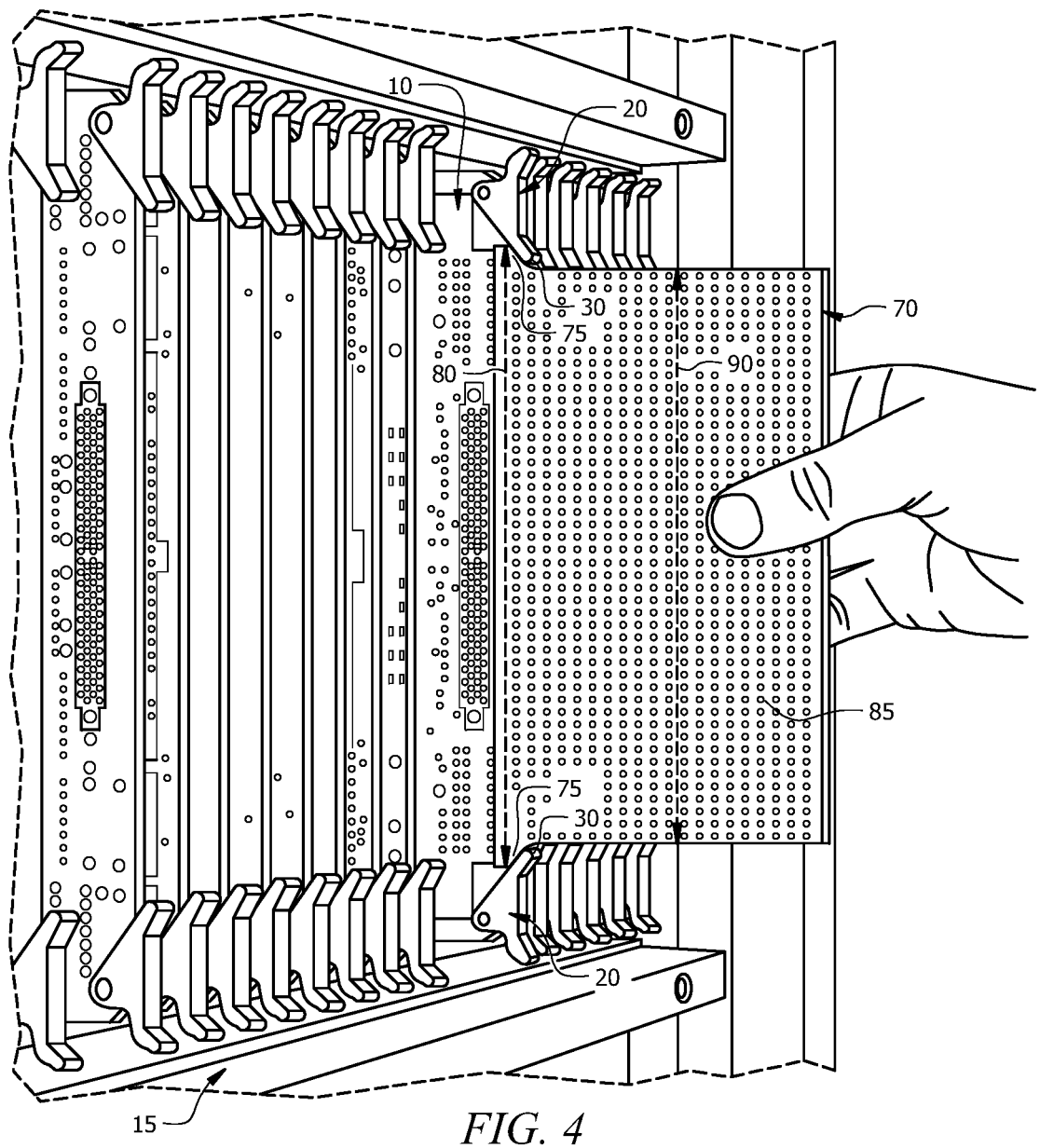
FIG. 4 shows the extraction tool being placed relative to a connected (e.g., seated) CCA.

FIG. 4 shows the tool 70 engaging a seated CCA 10 in accordance with aspects of the invention. Specifically, FIG. 4 shows the two ejectors 20 associated with the CCA 10 rotated to the first position relative to the CCA 10. At this first position of the ejectors 20, the first dimension 80 of the tool 70 is greater than the distance defined between the inboard legs 30 of the ejectors 20, while the second dimension 90 of the tool 70 is less than the distance defined between the inboard legs 30 of the ejectors 20. In this manner, the tool 70 may be positioned relative to the CCA 10 such that each of the flanges 75 contacts an underside of a respective one of the inboard legs 30, while the central body 85 of the tool extends between the two inboard legs 30 and outward from the rack 15.

Figure 5:
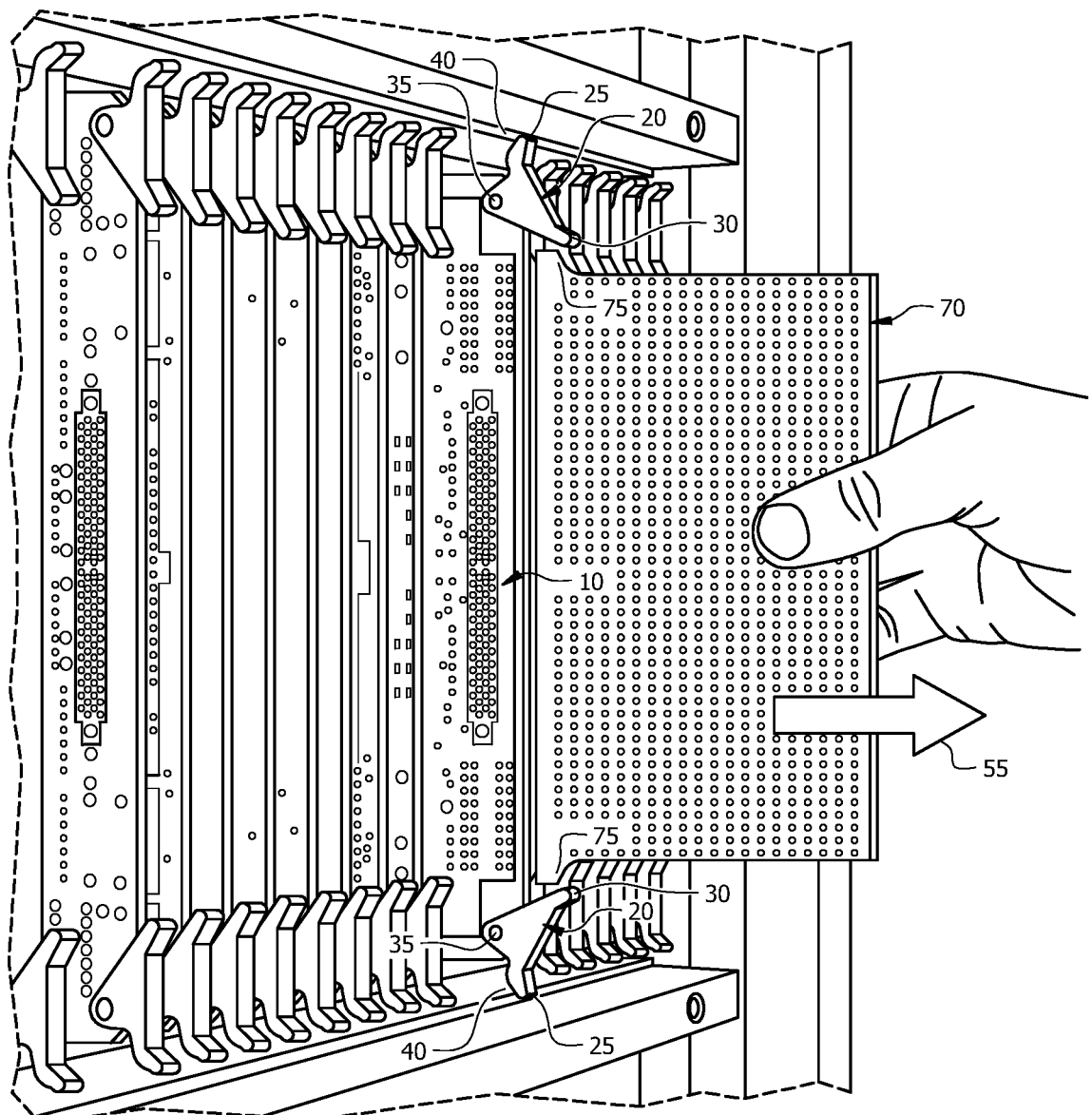
FIG. 5 shows the extraction tool disconnecting (e.g., unseating) the CCA from the computer.

FIG. 5 shows the tool 70 unseating the CCA 10 in accordance with aspects of the invention. Specifically, after being positioned as shown in FIG. 4, the tool 70 is pulled in the direction 55, e.g., outward from the rack 15. The flanges 75 simultaneously apply pressure to the inboard leg 30 of each ejector 20 to rotate the respective ejectors 20 relative to the CCA 10 about the respective pins 35. The outboard leg 25 of each respective ejector 20 remains abutted against the rail 40 during the rotation of the ejectors 20. In this manner, pulling the tool 70 in the direction 55 causes rotation of the ejectors 20 relative to the CCA 10, which in turn causes linear translation of the CCA 10 in the direction 55, thereby unseating the CCA 10 from the socket.

Still referring to FIG. 5, during the pulling of the tool 70 in the direction 55, the ejectors 20 are eventually rotated to the second position relative to the CCA 10. As noted herein, at the second position, the ejectors 20 define a second distance that is greater than the first dimension 80 of the tool 70. In this manner, by continuing to pull the tool in direction 55, the flanges 75 of the tool 70 may pass through the space between the ejectors 20, and the tool 70 may be disengaged from the CCA 10.

In embodiments, the first dimension 80 defined by the flanges 75 is configured relative to the CCA 10 and ejectors 20 such that the flanges 75 may pass between the ejectors 20 only after the ejectors 20 have rotated a sufficient amount to unseat the CCA 10 form the socket. In an exemplary implementation, and without limitation, the first dimension 80 between the outermost edges of the flanges is about 145 mm and the second dimension 90 defined by the body 85 is about 125 mm, such that each flange 75 extends outward about 10 mm from the body 85. This particular implementation of the tool is configured to be used with a CCA 10 in which the distance between the pins 35 is about 165 mm, and in which each of the ejectors 20 has a dimension of about 28 mm from a tip of the inboard leg 30 to a tip of the outboard leg 25. The invention is not limited to these dimensions, however, and the tool 75 may be adapted for use with other sized CCAs.

Additional aspects of the invention include manufacturing a CCA release tool as described herein.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

It is further noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular materials and embodiments, the present invention is not intended to be limited to the particulars disclosed herein; rather, the present invention extends to all functionally equivalent structures, methods and uses, and combinations thereof such as are within the scope of the appended claims.

What is claimed is:

1. A circuit card assembly release tool, comprising:
a body; and
two flanges extending outward from the body at an end of the body,
wherein the tool is structured and arranged such that the two flanges are adapted to simultaneously apply a force to two ejectors that are pivotally connected to a printed circuit board of a seated circuit card assembly when the tool is urged in a direction relative to the seated circuit card assembly;
each of the two ejectors is pivotally connected to the printed circuit board by a respective pin that permits rotational movement of the ejector relative to the printed circuit board;
the body and the flanges are a unitary structure;
the flanges are at a first end of the body;
the body includes a hole defining a hand grip at a second end of the body opposite the first end of the body; and
the hole is completely encircled by a material of the body.

2. The circuit card assembly release tool of claim 1, wherein the two flanges define a first dimension that is greater than a first distance defined between the two ejectors when the two ejectors are rotated to a first position relative to the circuit card assembly.

3. The circuit card assembly release tool of claim 2, wherein the first dimension is less than a second distance defined between the two ejectors when the two ejectors are rotated to a second position relative to the circuit card assembly.

4. The circuit card assembly release tool of claim 3, wherein the body defines a second dimension that is less than the first distance.

5. The circuit card assembly release tool of claim 4, wherein the second dimension is defined in a same direction as the first dimension.

6. The circuit card assembly release tool of claim 4, wherein the first dimension is about 145 mm and the second dimension is about 125 mm.

7. The circuit card assembly release tool of claim 1, wherein the unitary structure is composed of a material that is electrically non-conductive.

8. The circuit card assembly release tool of claim 7, wherein:
the hole has a first dimension in a first direction; and
the hole has a second dimension in a second direction perpendicular to the first direction, the second dimension being shorter than the first dimension.

9. The circuit card assembly release tool of claim 1, further comprising a grip material wrapped around the hand grip.

10. The circuit card assembly release tool of claim 1, wherein:
the flanges extend outward from the first end of the body in a transverse direction that is transverse to the direction the tool is urged relative to the seated circuit card assembly when applying the force to the two ejectors.

11. A circuit card assembly release tool, comprising:
a body; and
two flanges extending outward from the body at an end of the body,
wherein the tool is structured and arranged such that the two flanges are adapted to simultaneously apply a force to two ejectors that are pivotally connected to a seated circuit card assembly when the tool is urged in a direction relative to the seated circuit card assembly,
the two flanges define a first dimension that is greater than a first distance defined between the two ejectors when the two ejectors are rotated to a first position relative to the circuit card assembly,
the first dimension is less than a second distance defined between the two ejectors when the two ejectors are rotated to a second position relative to the circuit card assembly,
the first position of the ejectors relative to the circuit card assembly corresponds to the circuit card assembly being seated in a socket; and
the tool is structured and arranged such that the two flanges are adapted to simultaneously apply a force to the two ejectors when the tool is urged in a direction away from the circuit card assembly.

12. The circuit card assembly release tool of claim 11, wherein the second position of the ejectors relative to the circuit card assembly corresponds to the circuit card assembly being unseated from the socket.

13. A circuit card assembly release tool, comprising:
a body; and
two flanges extending outward from the body at an end of the body,
wherein the two flanges define a first dimension that is greater than a first distance defined between two ejectors that are pivotally connected to a circuit card assembly when the two ejectors are rotated to a first position relative to the circuit card assembly;
the first dimension is less than a second distance defined between the two ejectors when the two ejectors are rotated to a second position relative to the circuit card assembly;
each of the two ejectors is pivotally connected to a printed circuit board of the circuit card assembly by a respective pin that permits rotational movement of the ejector between the first position relative to the printed circuit board and the second position relative to the printed circuit board; and
the tool is structured and arranged such that the two flanges are adapted to simultaneously apply a force to the two ejectors when the tool is urged in a direction away from the circuit card assembly.

14. The circuit card assembly release tool of claim 13, wherein the body defines a second dimension that is in a same direction as the first dimension and less than the first distance.

15. The circuit card assembly release tool of claim 14, wherein the first dimension is about 145 mm and the second dimension is about 125 mm.

16. The circuit card assembly release tool of claim 14, wherein:

the body and the flanges are a unitary structure composed of a material that is electrically non-conductive; and a hole in the body defines a hand grip at an end of the body opposite the end associated with the flanges.

17. The circuit card assembly release tool of claim 13, wherein:

the first position of the ejectors relative to the circuit card assembly corresponds to the circuit card assembly being seated in a socket;

the second position of the ejectors relative to the circuit card assembly corresponds to the circuit card assembly being unseated from the socket; and each of the flanges are configured to contact an underside of an inboard leg of one of the ejectors when the ejectors are in the first position, and to apply the force to the ejectors that causes the ejectors to rotate to the second position, wherein the rotation of the ejectors from the first position to the second position causes an outboard leg of each of the ejectors to urge against a respective rail and move the circuit card assembly out of the socket.

\* \* \* \* \*